US012563001B1

(12) United States Patent
Lin et al.

(10) Patent No.: US 12,563,001 B1
(45) Date of Patent: Feb. 24, 2026

(54) EXECUTION METHOD AND EXECUTION SYSTEM FOR VIRTUAL MEETING

(71) Applicant: United Microelectronics Corp., Hsinchu (TW)

(72) Inventors: Ching-Pei Lin, Hsinchu County (TW); Chuan-Guei Wang, Yunlin County (TW); Hsin-Yu Chen, Tainan (TW); Ching-Yu Tseng, Tainan (TW)

(73) Assignee: UNITED MICROELECTRONICS CORP., Hsinchu (TW)

( * ) Notice: Subject to any disclaimer, the term of this patent is extended or adjusted under 35 U.S.C. 154(b) by 49 days.

(21) Appl. No.: 18/896,987

(22) Filed: Sep. 26, 2024

(30) Foreign Application Priority Data

Aug. 21, 2024 (TW) ................................. 113131442

(51) Int. Cl.
*H04L 51/02* (2022.01)
*G06F 3/04817* (2022.01)
(52) U.S. Cl.
CPC .......... *H04L 51/02* (2013.01); *G06F 3/04817* (2013.01)
(58) Field of Classification Search
None
See application file for complete search history.

(56) References Cited

U.S. PATENT DOCUMENTS

| | | | |
|---|---|---|---|
| 6,064,978 A | 5/2000 | Gardner et al. | |
| 11,743,378 B1 * | 8/2023 | Johnston | H04M 3/5315 704/270.1 |
| 12,244,584 B1 * | 3/2025 | Balasubramanian ... | G06F 21/62 |
| 12,450,506 B2 * | 10/2025 | Nomula | G06N 20/00 |
| 2004/0044542 A1 | 3/2004 | Beniaminy et al. | |
| 2024/0250921 A1 * | 7/2024 | Klemm | H04L 51/52 |
| 2025/0181327 A1 * | 6/2025 | Sohn | G06F 40/279 |
| 2025/0325238 A1 * | 10/2025 | Ruth | A61B 5/7445 |

* cited by examiner

*Primary Examiner* — Quang N Nguyen
(74) *Attorney, Agent, or Firm* — WPAT, PC

(57) ABSTRACT

An execution method and an execution system for a virtual meeting are provided. The execution method includes the following steps. A discussion item is received. The discussion item is compiled into a plurality of tasks. The tasks are distributed to a plurality of virtual agents. At least one analysis information is obtained by at least one of the virtual agents using an industrial data database. The industrial data database is built via an analytic AI model. At least one guidance information is obtained by at least one of the virtual agents using an industrial knowledge database. The industrial knowledge database is built via a generative AI model. If the analysis information and the guidance information meet the predetermined condition, the virtual expert compiles the analysis information and the guidance information into a recommendation report.

12 Claims, 7 Drawing Sheets

EXECUTION METHOD AND EXECUTION SYSTEM FOR VIRTUAL MEETING

This application claims the benefit of Taiwan application Serial No. 113131442, filed Aug. 21, 2024, the subject matter of which is incorporated herein by reference.

BACKGROUND OF THE INVENTION

Field of the Invention

The invention relates in general to an execution method and an execution system for an application, and more particularly an execution method and an execution system for a virtual meeting.

Description of the Related Art

The manufacturing process of semiconductor is extremely complicated. In the factory, managers need to participate in daily meetings. Each manager needs to report the status of previous shaft, including problems, resolutions, and handling process.

However, it would cost a large amount of time for all managers to participate in the daily meeting in person. The participants need to spend time preparing for a report. Since the report distributed at the meeting may not reflect the instant status, there is time lag in decision making.

Even if the frequency or duration of meeting is increased, a better effect still cannot be guaranteed. Therefore, it has become a prominent task for the industries to provide a virtual meeting with which factory issues that need to be discussed can be more effectively resolved.

SUMMARY OF THE INVENTION

The invention is directed to an execution method and an execution system for a virtual meeting. The virtual meeting is smoothly performed using the industrial dual AI technology. The statistics, summary and analysis results of historical data can be quickly obtained using the analytic AI model. Moreover, even when there are no entity persons participating in the virtual meeting VMT, open and extensive hypotheses or suggestions still can be obtained using the generative AI model. With the integration of the analytic AI model and the generative AI model, conducive conclusion of the discussion can be quickly obtained in the virtual meeting VMT.

According to one embodiment of the present invention, an execution method for a virtual meeting is provided. The execution method for a virtual meeting includes the following steps. A discussion item is received. The discussion item is compiled into a plurality of tasks. The tasks are distributed to a plurality of virtual agents. At least one analysis information is obtained by at least one of the virtual agents using an industrial data database. The industrial data database is built via an analytic AI model. At least one guidance information is obtained by at least one of the virtual agents using an industrial knowledge database. The industrial knowledge database is built via a generative AI model. Whether the analysis information and the guidance information meet a predetermined condition is determined by the virtual modulator. If the analysis information and the guidance information meet the predetermined condition, the virtual expert compiles the analysis information and the guidance information into a recommendation report.

According to another embodiment of the present invention, an execution system for a virtual meeting is provided.

The execution system for a virtual meeting includes a display unit, a virtual expert, a virtual modulator, a plurality of virtual agents, an industrial data database, an analytic AI model, an industrial knowledge database and a generative AI model. The display unit is used to display a discussion item. The virtual expert is connected to the display unit. The virtual expert is used to compile the discussion item into a plurality of tasks. The virtual modulator is connected to the virtual expert. The virtual agents are connected to the virtual modulator. The virtual modulator is used to distribute the tasks to the virtual agents. The industrial data database is connected to the virtual agents. The analytic AI model is used to build the industrial data database. The industrial knowledge database is connected to the virtual agents. The generative AI model is used to build the industrial knowledge database. At least one of the virtual agents obtains at least one analysis information using the industrial data database. At least one of the virtual agents obtains at least one guidance information using the industrial knowledge database. The virtual modulator determines whether the analysis information and the guidance information meet a predetermined condition. If the analysis information and the guidance information meet the predetermined condition, then the virtual expert compiles the analysis information and the guidance information into a recommendation report.

The above and other aspects of the invention will become better understood with regard to the following detailed description of the preferred but non-limiting embodiment(s). The following description is made with reference to the accompanying drawings.

DETAILED DESCRIPTION OF THE INVENTION

Technical terms are used in the specification with reference to the prior art used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all of the technical features of any embodiment of the present disclosure.

Figure 1:
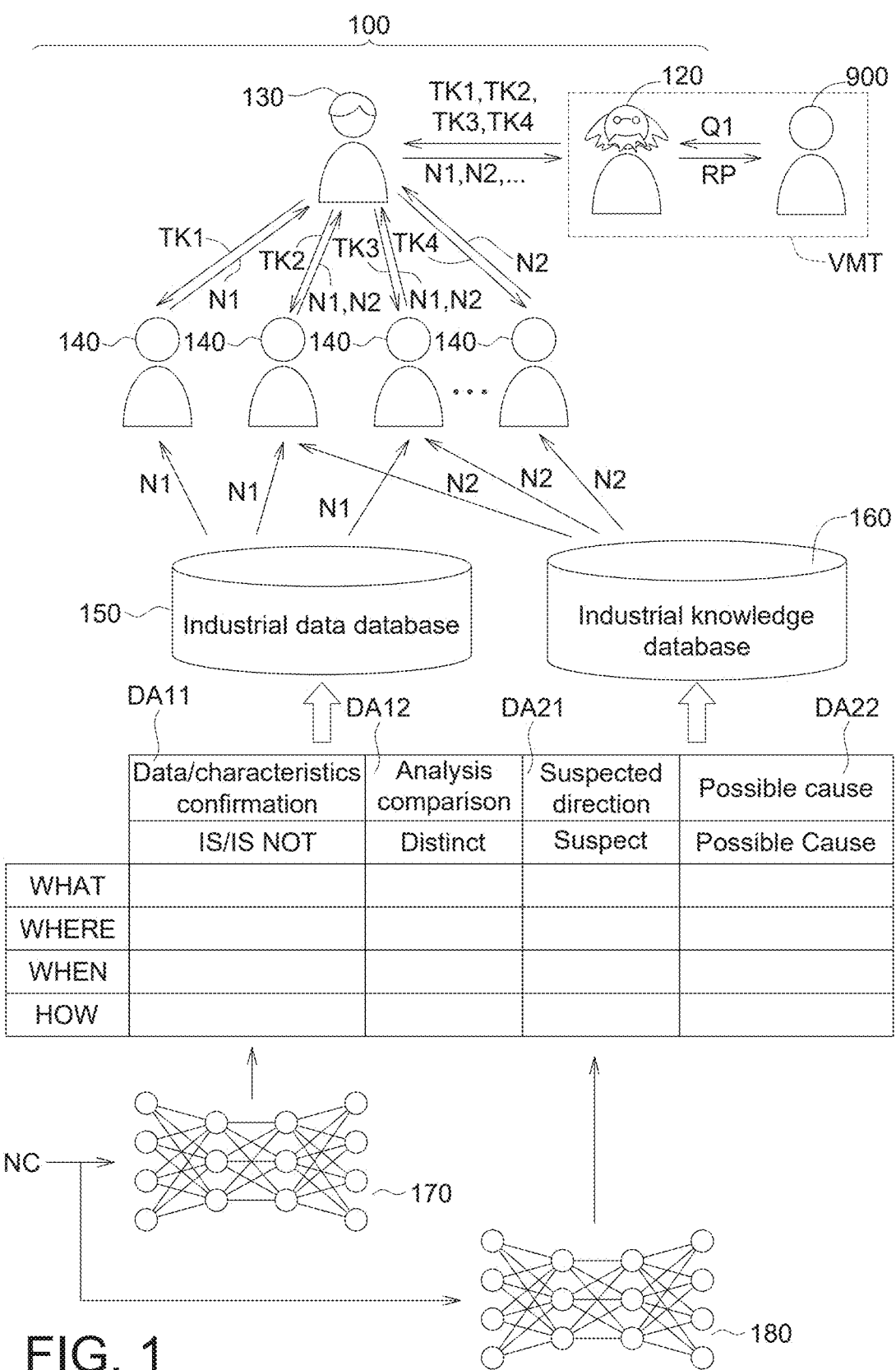
FIG. 1 illustrates a schematic diagram of a virtual meeting according to an embodiment.

Referring to FIG. 1, a schematic diagram of a virtual meeting VMT according to an embodiment is illustrated. In the virtual meeting VMT, the participant can be an entity person 900 or a virtual expert 120. The virtual expert 120 is not an entity person; rather, it is a device connected to an analytic AI model 170 and a generative AI model 180. The virtual expert 120 provides a precise analysis information N1 by analyzing various data of the production line using the analytic AI model 170 and provides an open guidance information N2 by analyzing the discussion item Q1 using the generative AI model 180.

The operations of the analytic AI model 170 converge with reference to accuracy and correct rate as a reference to obtain the statistics, summary and analysis results of historical data or the prediction and inference information of future data. These types of information pertain to analysis information N1.

The operations of the generative AI model 180 converge with reference to the degree of relevance and the degree of expansion to obtain open and extensive hypotheses or suggestions. These types of information pertain to guidance information N2.

In comparison to the scenario where only the analytic AI model 170 is used, the scenario where both the analytic AI model 170 and the generative AI model 180 are used allows more groups of discontinuous analysis information N1 to be linked and form the guidance information N2 conducive to the discussion item Q1.

Figure 2:
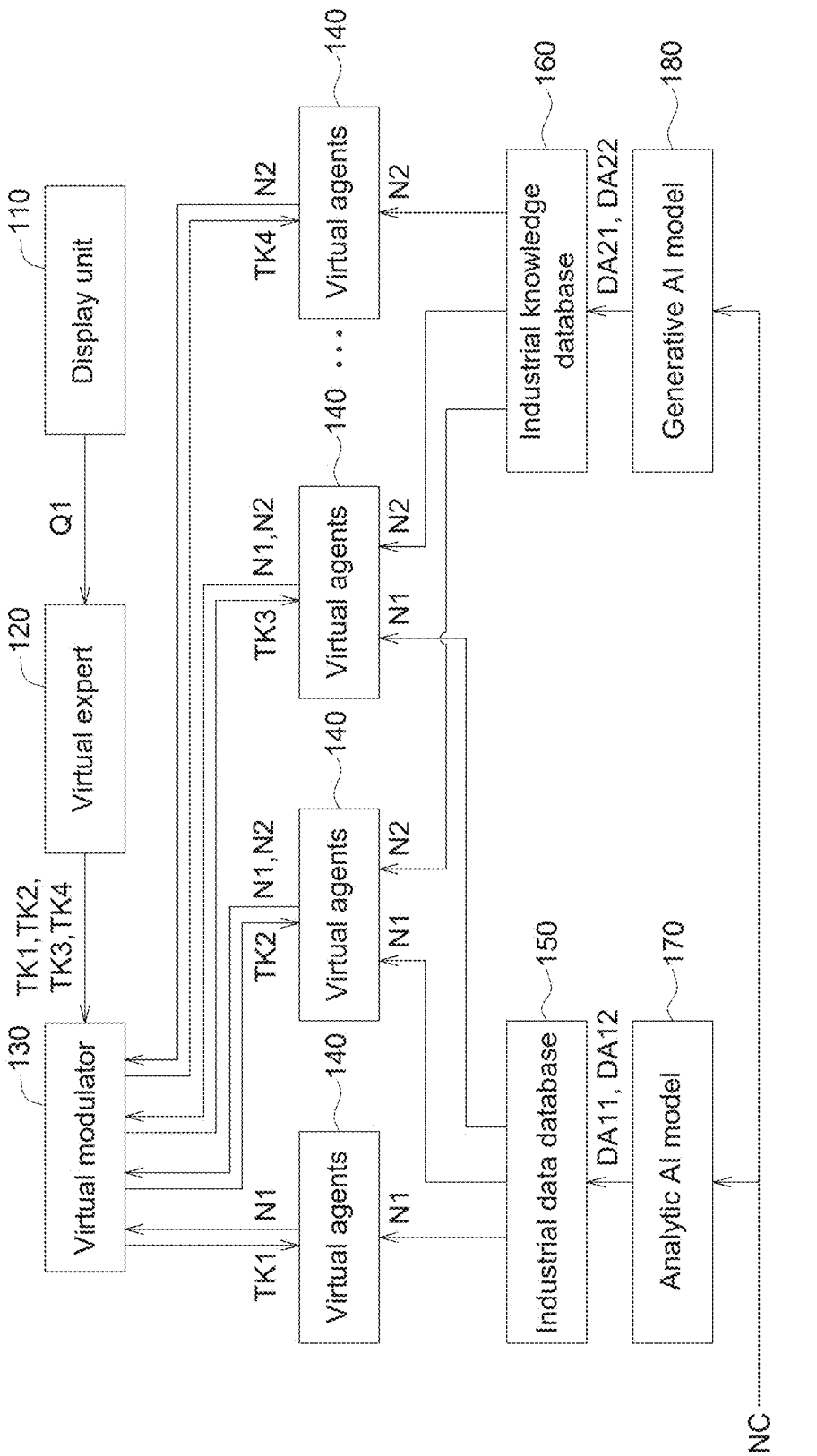
FIG. 2 illustrates an execution system for a virtual meeting according to an embodiment.

Referring to FIG. 2, an execution system 100 for a virtual meeting VMT according to an embodiment is illustrated. The execution system 100 for a virtual meeting VMT can be realized by such as a server, a desktop computer, a cloud computing center, or a portable computing device. The execution system 100 for a virtual meeting VMT includes a display unit 110, the said virtual expert 120, a virtual modulator 130, a plurality of virtual agents 140, an industrial data database 150, an industrial knowledge database 160, an analytic AI model 170 and a generative AI model 180. The display unit 110, used to display information, can be realized by such as an LCD display panel, an OLED display panel, or an electronic paper display panel. The virtual expert 120, the virtual modulator 130, the virtual agents 140, the analytic AI model 170 and the generative AI model 180 are used to execute various analysis, recognition and processing procedures, and can be realized by such as a circuit, a circuit board, a storage device for storing program code or a chip. The chip can be realized by such as a central processing unit (CPU), a programmable genera/specific purpose micro control unit (MCU), a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable gate array (FPGA) or other similar elements or a combination thereof.

The industrial data database 150 and the industrial knowledge database 160 are used to store data and can be realized by any types of fixed or movable random access memory (RAM), read-only memory (ROM), flash memory, hard disk drive (HDD), solid state drive (SSD) or other similar elements or a combination thereof.

In the present embodiment, the virtual meeting VMT is smoothly performed using the industrial dual AI technology. The statistics, summary and analysis results of historical data can be quickly obtained using the analytic AI model 170; moreover, even when there are no entity persons participating in the virtual meeting VMT, open and extensive hypotheses or suggestions still can be obtained using the generative AI model 180. With the integration of the analytic AI model 170 and the generative AI model 180, conducive conclusion of the discussion can be quickly obtained in the virtual meeting VMT. Operations of each of the above elements are explained below in details with an accompanying flowchart.

Figure 3:
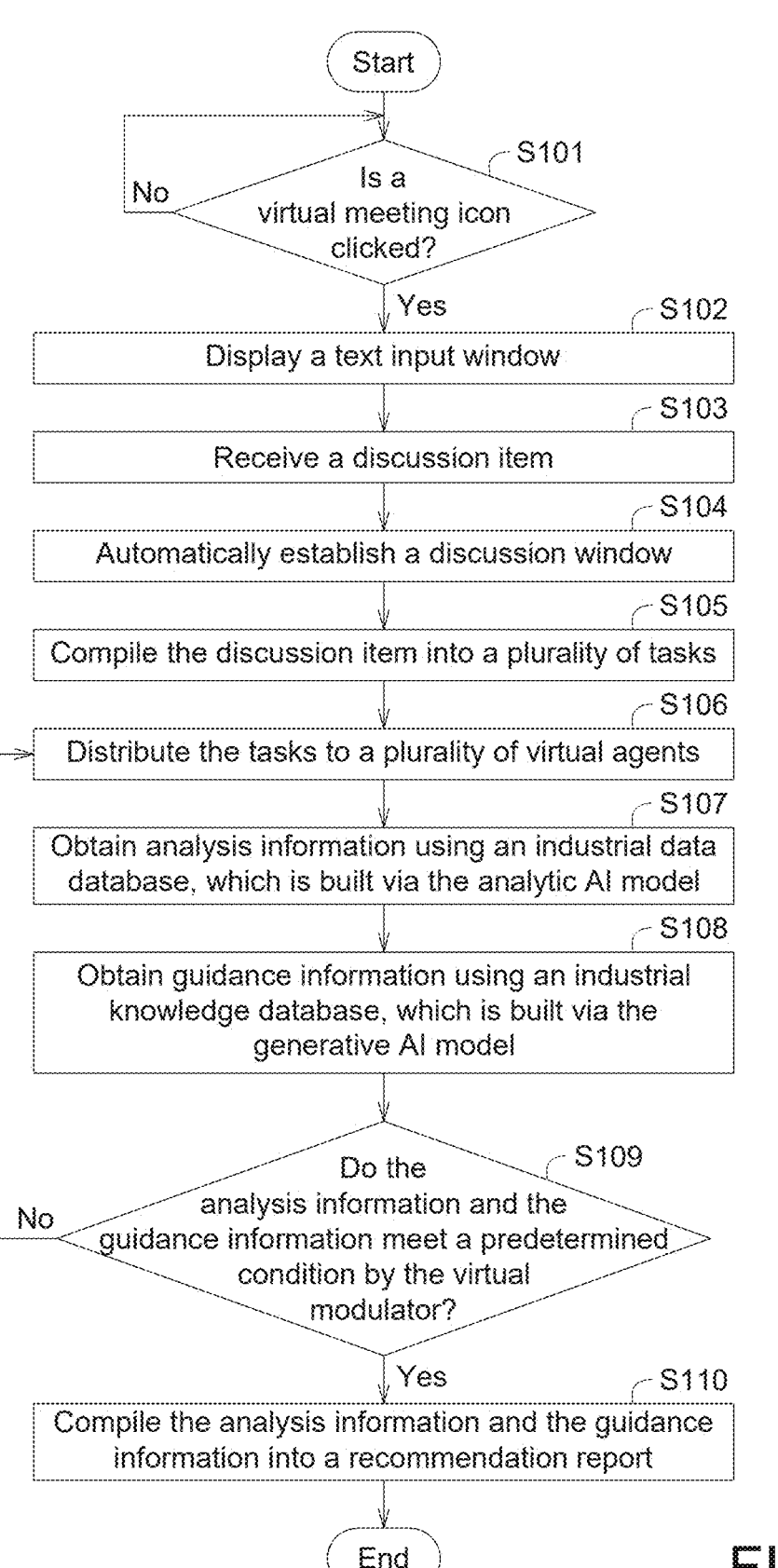
FIG. 3 illustrates a flowchart of an execution method for a virtual meeting according to an embodiment.

Referring to FIG. 3, a flowchart of an execution method for a virtual meeting VMT according to an embodiment is illustrated. The execution method for a virtual meeting VMT of the present embodiment merges the procedures of the analytic AI model 170 and the generative AI model 180 using the task distribution technology, so that the virtual meeting VMT can be smoothly performed. The execution method for a virtual meeting VMT of FIG. 3 includes steps S101 to S110.

Figure 4:
FIG. 4 exemplarily illustrates step S101.

Referring to FIG. 4, step S101 is illustrated. In step S101 as indicated in FIG. 4, whether a virtual meeting icon VC is clicked is determined by the virtual expert 120. The virtual meeting icon VC is such as displayed on the display unit 110. For instance, the virtual meeting icon VC is displayed on a data chart window W9 or other windows. In an embodiment, the virtual meeting icon VC can reside on the topmost layer of the frame of the display unit 110. When checking the data chart window W9 or other windows, the entity person 900 can directly click on the virtual meeting icon VC to perform the virtual meeting VMT if the topic requires discussion.

If the virtual meeting icon VC is clicked, the method proceeds to step S102.

Figure 5:
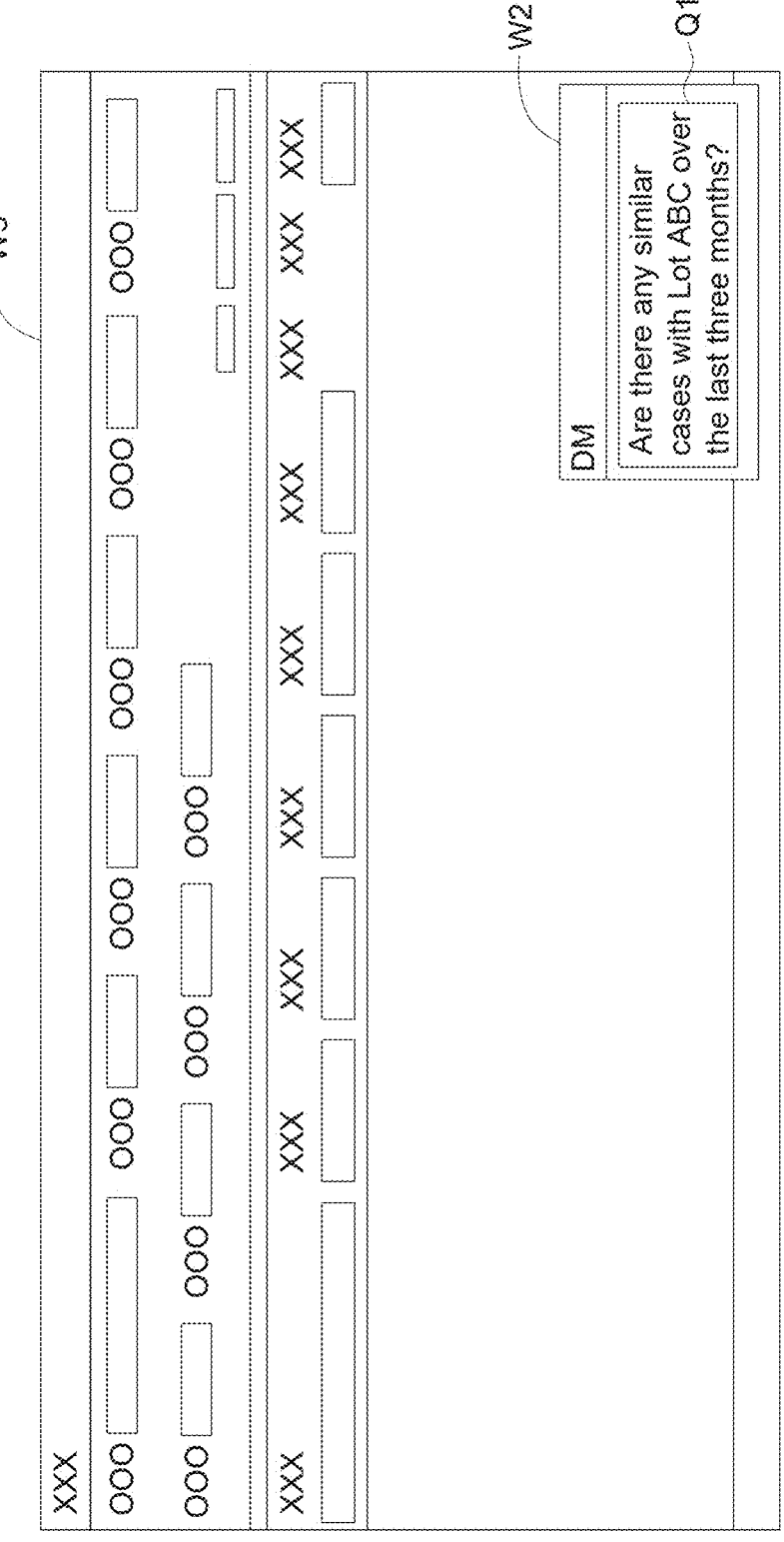
FIG. 5 exemplarily illustrates step S102.

Referring to FIG. 5, step S102 is illustrated. In step S102 as indicated in FIG. 5, a text input window W2 is displayed by the virtual expert 120. The text input window W2 is used to receive a discussion item Q1. The discussion item Q1 can be an inquiry item, a search item, or a request item. For instance, the discussion item Q1 is "Are there any similar cases with Lot ABC over the last three months?"

Then, the method proceeds to step S103 as indicated in FIG. 5, the discussion item Q1 is received by the virtual expert 120. For instance, the virtual expert 120 obtains the discussion item Q1 from the text input window W2.

Figure 6:
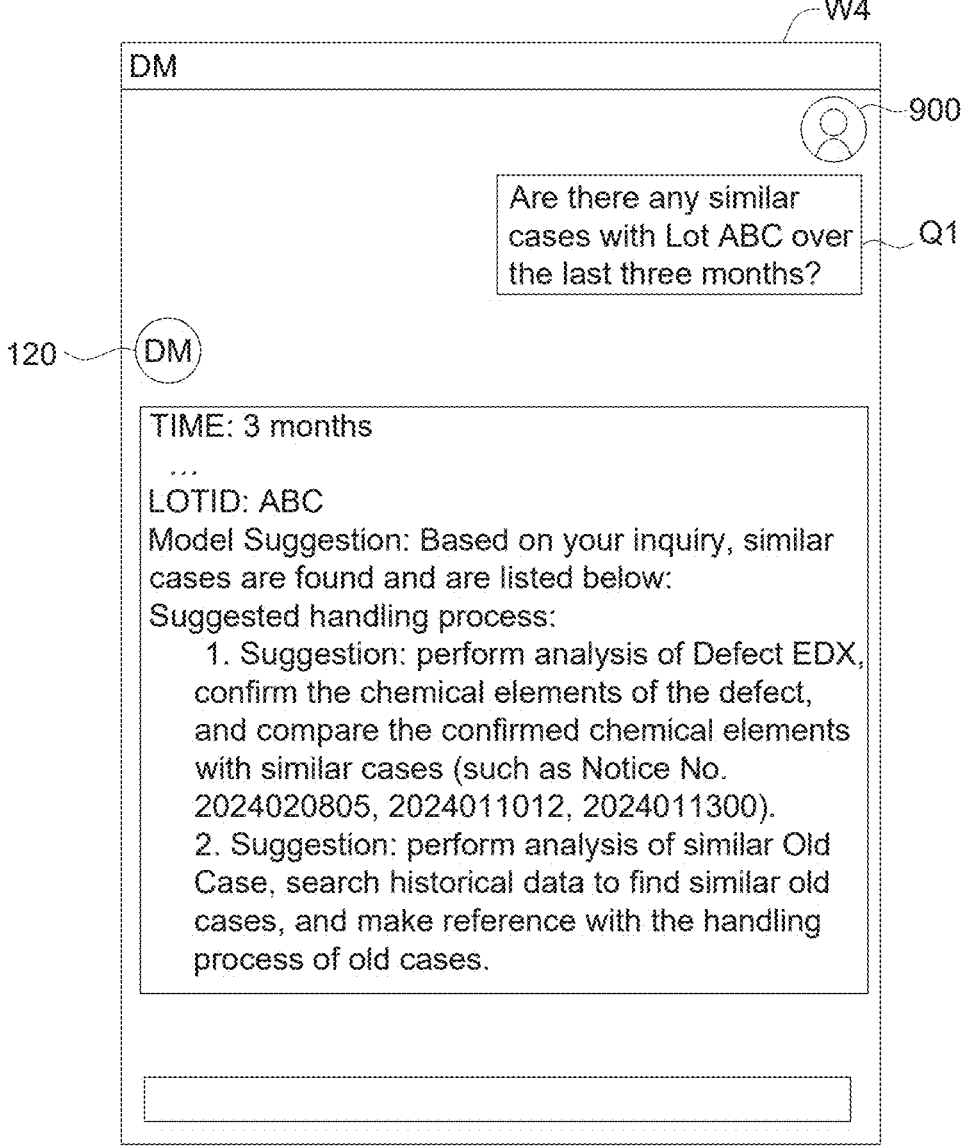
FIG. 6 exemplarily illustrates step S104.

Referring to FIG. 6, step S104 is illustrated. In step S104, a discussion window W4 is automatically established by the virtual expert 120. For instance, the discussion window W4 adds the entity person 900 and the virtual expert 120. The discussion item Q1 is displayed in the speaking area of the entity person 900.

Then, the method proceeds to step S105 as indicated in FIG. 1, the discussion item Q1 is compiled into a plurality of tasks (including but not limited to tasks TK1, TK2, TK3, and TK4) by the virtual expert 120.

Then, the method proceeds to step S106 as indicated in FIG. 1, the tasks TK1, TK2, TK3, and TK4 are distributed to a plurality of virtual agents 140 by the virtual modulator 130. The virtual modulator 130 can distribute the tasks TK1, TK2, TK3, and TK4 to different virtual agents 140. Or, the virtual modulator 130 can distribute tasks TK1 and TK2 to the same virtual agent 140. Moreover, the virtual modulator 130 can arrange the order by which the tasks TK1, TK2, TK3, and TK4 are performed. For instance, the tasks TK1, TK2, TK3, and TK4 can be performed at the same time or according to a predetermined order.

Then, the method proceeds to step S107 as indicated in FIG. 1, at least one analysis information N1 is obtained by at least one of the virtual agents 140 using the industrial data database 150. The industrial data database 150 is built via the analytic AI model 170. The operations of the analytic AI model 170 converge with reference to accuracy and correct rate as a reference to obtain the statistics, summary and analysis results of historical data or the prediction and inference information of future data. These types of information are stored in the industrial data database 150.

The industrial data database 150 built via the analytic AI model 170 includes a data characteristics confirmation information (IS/IS NOT) DA11 and an analysis comparison information (Distinct) DA12. The data characteristics confirmation information DA11 and the analysis comparison information DA12 includes information such as "WHAT, WHERE, WHEN, and HOW".

Then, the method proceeds to step S108 as indicated in FIG. 1, at least one guidance information N2 is obtained by at least one of the virtual agents 140 using an industrial knowledge database 160. The industrial knowledge database 160 is built via the generative AI model 180. The operations of the generative AI model 180 converge with reference to accuracy and correct rate as a reference to obtain open and extensive hypotheses or suggestions. These types of information are stored in the industrial knowledge database 160.

The industrial knowledge database 160 built via the generative AI model 180 includes a suspected direction information DA21 and a possible cause information DA22. The suspected direction information DA21 and the possible cause information DA22 includes information such as "WHAT, WHERE, WHEN, and HOW".

In an embodiment, a particular virtual agent 140 may obtain an analysis information N1, and a particular virtual agent 140 may obtain a guidance information N2. Or, a virtual agent 140 may obtain an analysis information N1 and a guidance information N2 at the same time.

As indicated in FIG. 1, whether the analysis information N1 and the guidance information N2 meet a predetermined condition is determined by the virtual modulator 130. The predetermined condition is such as whether the guidance information N2 does not pertain to another inquiry item, search item, or request item. If the guidance information N2 pertains to another inquiry item, search item, or request item, it is determined that the guidance information N2 does not meet the predetermined condition, and step S106 needs to be performed again. Step S106 to S108 will be repeated until the predetermined condition is met. That is, based on the initial discussion item Q1, the execution system 100 for a virtual meeting VMT will generate a deeper level of the discussion item during the inference and analysis process and perform further inference on the deeper level of the discussion item to obtain an optimal reply.

If the analysis information N1 and the guidance information N2 meet the predetermined condition, the method proceeds to step S109.

In step S109 as indicated in FIG. 6, the analysis information N1 and the guidance information N2 are compiled into a recommendation report RP by the virtual expert 120.

In FIG. 6, the recommendation report RP provides, for instance, "Output 1" and "Output 2". "Output 1" replies to the key content of the message interpreted by the generative AI model 180; for instance, "Output 1" is "Three months, ABC". "Output 2" replies to the suggestion provided by the analytic AI model 170 and the generative AI model 180. For instance, "Output 2" is "Based on your inquiry, similar cases are found and are listed below: Suggested handling process:

1. Suggestion: perform analysis of Defect EDX, confirm the chemical elements of the defect, and compare the confirmed chemical elements with similar cases (such as Notice No. 2024020805, 2024011012, 2024011300).
2. Suggestion: perform analysis of similar Old Case, search historical data to find similar old cases, and make reference with the handling process of old cases."

In the above embodiment, the analysis information N1 and the guidance information N2 are obtained using the industrial data database 150 built via the analytic AI model 170 and the industrial knowledge database 160 built via the generative AI model 180.

In another embodiment, there is no need to build the industrial data database 150 and the industrial knowledge database 160; rather, the analysis information N1 is directly replied by the analytic AI model 170, and the guidance information N2 is directly replied by the generative AI model 180.

Figure 7:
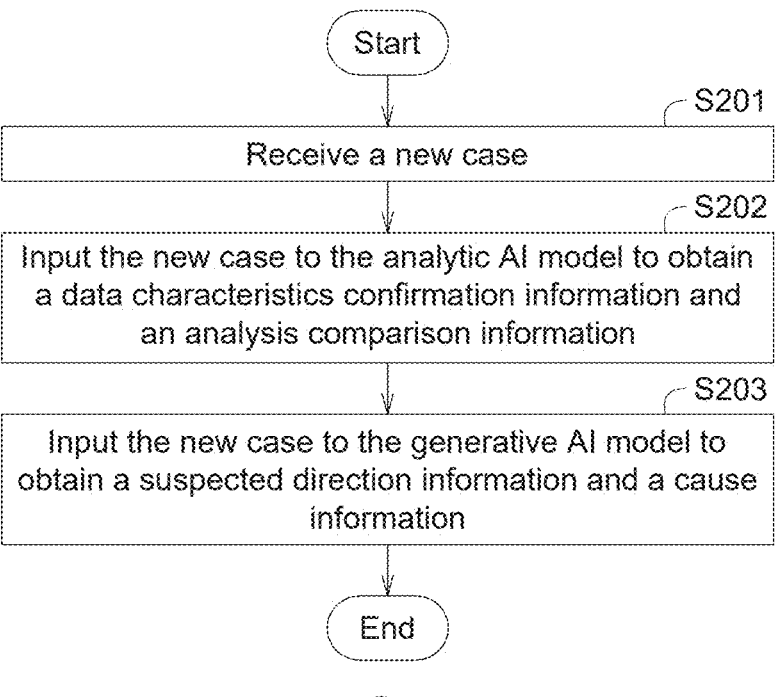
FIG. 7 illustrates a method for building an industrial data database and an industrial knowledge database in an execution method for a virtual meeting.

The building method of the industrial data database 150 and the industrial knowledge database 160 is disclosed below. Referring to FIG. 7, a method for building an industrial data database 150 and an industrial knowledge database 160 in an execution method for a virtual meeting VMT is illustrated. The execution method for a virtual meeting VMT further includes step S201 to S203. In step S201 as indicated in FIG. 1, a new case NC is received by the execution system 100 for a virtual meeting VMT. The new case NC can be the manufacturing data of a particular batch of product and the production result of the final product or can be a particular manufacturing problem and a resolution method thereof.

Then, the method proceeds to step S202 as indicated in FIG. 1, the new case NC is inputted to the analytic AI model 170 to obtain a data characteristics confirmation information DA11 and an analysis comparison information DA12.

Then, the method proceeds to step S203 as indicated in FIG. 1, the new case NC is inputted to the generative AI model 180 to obtain a suspected direction information DA21 and a cause information DA22.

In the present embodiment, the virtual meeting VMT is smoothly performed using the industrial dual AI technology. The statistics, summary and analysis results of historical data can be quickly obtained using the analytic AI model 170. Moreover, even when there are no entity persons participating in the virtual meeting VMT, open and extensive hypotheses or suggestions still can be obtained using the generative AI model 180. With the integration of the analytic AI model 170 and the generative AI model 180, conducive conclusion of the discussion can be quickly obtained in the virtual meeting VMT.

Distinctive features of some implementations or examples for implementing the present disclosure are disclosed above. Specific examples (such as numerals or designations disclosed above) are used in the descriptions of elements and configurations to simplify/illustrate some implementations of the present disclosure. These elements and configurations are exemplified for explanatory purpose only, not for limiting the scope of protection. Besides, some implementations of the present disclosure can repeat reference symbols and/or letters in various example. The said repetition is for the purpose of simplicity and clarity only, not for specifying the relationship among various implementations and/or configurations.

While the invention has been described by way of example and in terms of the preferred embodiment(s), it is to be understood that the invention is not limited thereto. Based on the technical features embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. An execution method for a virtual meeting, comprising:
determining whether a virtual meeting icon is clicked;
in response to the virtual meeting icon is clicked, displaying a text input window, which is used to receive a discussion item;

receiving the discussion item;

compiling the discussion item into a plurality of tasks by a virtual expert;

distributing the tasks to a plurality of virtual agents by a virtual modulator;

obtaining at least one analysis information by at least one of the virtual agents using an industrial data database, which is built via an analytic AI model;

obtaining at least one guidance information by at least one of the virtual agents using an industrial knowledge database, which is built via a generative AI model;

determining whether the at least one analysis information and the at least one guidance information meet a predetermined condition by the virtual modulator;

compiling the at least one analysis information and the at least one guidance information into a recommendation report by the virtual expert, if the at least one analysis information and the at least one guidance information meet the predetermined condition; and automatically establishing a discussion window to reply to the recommendation report.

2. The execution method for the virtual meeting according to claim 1, wherein the industrial data database built via the analytic AI model comprises a data characteristics confirmation information and an analysis comparison information.

3. The execution method for the virtual meeting according to claim 1, wherein the industrial knowledge database built via the generative AI model comprises a suspected direction information and a possible cause information.

4. The execution method for the virtual meeting according to claim 1, wherein at least one of the virtual agents obtains the at least one analysis information and the at least one guidance information simultaneously.

5. The execution method for the virtual meeting according to claim 1, further comprising:

receiving a new case;

inputting the new case to the analytic AI model to obtain a data characteristics confirmation information and an analysis comparison information.

6. The execution method for the virtual meeting according to claim 5, further comprising:

inputting the new case to the generative AI model to obtain a suspected direction information and a cause information.

7. An execution system for a virtual meeting, comprising:

a display unit, used to display a discussion item;

a virtual expert, connected to the display unit, wherein the virtual expert is used to compile the discussion item into a plurality of tasks;

a virtual modulator, connected to the virtual expert;

a plurality of virtual agents, connected to the virtual modulator, wherein the virtual modulator is used to distribute the tasks to the virtual agents; an industrial data database, connected to the virtual agents;

an analytic AI model, used to build the industrial data database; an industrial knowledge database, connected to the virtual agents; and a generative AI model, used to build the industrial knowledge database;

wherein at least one of the virtual agents obtains at least one analysis information using the industrial data database; at least one of the virtual agents obtains at least one guidance information using the industrial knowledge database; the virtual modulator determines whether the at least one analysis information and the at least one guidance information meet a predetermined condition; and if the at least one analysis information and the at least one guidance information meet the predetermined condition, then the virtual expert compiles the at least one analysis information and the at least one guidance information into a recommendation report;

wherein the virtual expert is further used to determine whether a virtual meeting icon displayed by the display unit is clicked; if the virtual meeting icon is clicked, then the virtual expert displays a text input window on the display unit, and the text input window is used to receive the discussion item; the virtual expert further automatically establishes a discussion window on the display unit, and the discussion window is used to reply to the recommendation report.

8. The execution system for the virtual meeting according to claim 7, wherein the industrial data database built via the analytic AI model comprises a data characteristics confirmation information and an analysis comparison information.

9. The execution system for the virtual meeting according to claim 7, wherein the industrial knowledge database built via the generative AI model comprises a suspected direction information and a possible cause information.

10. The execution system for the virtual meeting according to claim 7, wherein at least one of the virtual agents obtains the at least one analysis information and the at least one guidance information simultaneously.

11. The execution system for the virtual meeting according to claim 7, wherein the analytic AI model is further used to receive a new case to obtain a data characteristics confirmation information and an analysis comparison information.

12. The execution system for the virtual meeting according to claim 11, wherein the generative AI model is further used to receive the new case to obtain a suspected direction information and a possible cause information.

\* \* \* \* \*